United States Patent [19]

Hill et al.

[11] Patent Number: 5,315,973
[45] Date of Patent: May 31, 1994

[54] INTENSIFIER-INJECTOR FOR GASEOUS FUEL FOR POSITIVE DISPLACEMENT ENGINES

[75] Inventors: Philip G. Hill, Vancouver; K. Bruce Hodgins, Delta, both of Canada

[73] Assignee: University of British Columbia, Vancouver, Canada

[21] Appl. No.: 797,442

[22] Filed: Nov. 22, 1991

Related U.S. Application Data

[63] Continuation-in-part of Ser. No. 441,104, Nov. 27, 1989, Pat. No. 5,067,467.

[51] Int. Cl.5 .............. F02M 21/02; F02M 61/00; F02B 3/00
[52] U.S. Cl. ............... 123/304; 123/299; 123/27 GE; 123/525; 239/533.12
[58] Field of Search ........... 123/27 GE, 575, 299, 123/300, 304, 525; 239/533.12

[56] References Cited

U.S. PATENT DOCUMENTS

| | | | |
|---|---|---|---|
| 3,644,076 | 2/1972 | Bagge | 239/434 |
| 3,996,906 | 12/1976 | Bubniak et al. | 239/408 |
| 4,091,772 | 5/1978 | Heater et al. | 123/27 GE |
| 4,112,899 | 9/1978 | Kramer | 239/533.12 |
| 4,546,740 | 10/1985 | Clements et al. | 123/304 |
| 4,704,997 | 11/1987 | Endo et al. | 123/27 GE |
| 4,742,801 | 5/1988 | Kelgard | 123/526 |
| 4,831,982 | 5/1989 | Baranescu | 123/300 |
| 4,865,001 | 9/1989 | Jensen | 123/27 GE |
| 4,922,862 | 5/1990 | Casacci | 123/575 |
| 5,067,467 | 11/1991 | Hill et al. | 123/497 |
| 5,136,986 | 8/1992 | Jensen | 123/27 GE |
| 5,190,216 | 3/1993 | Deneke | 239/434 |

Primary Examiner—Noah P. Kamen
Assistant Examiner—Erick Solis
Attorney, Agent, or Firm—Seed and Berry

[57] ABSTRACT

This invention relates to a novel device for compressing and injecting gaseous fuel from a variable pressure gaseous fuel supply into a fuel receiving apparatus. More particularly, this invention relates to an intensifier-injector which compresses and injects gaseous fuel from a variable pressure source into the cylinder of a positive displacement engine. An intensifier-injector for gaseous fuels in internal combustion engines comprising means which utilizes the compressed gas from the chamber of the internal combustion engine or compressed fluid or gas from an external compressor to drive an intensifier means which raises the pressure of fuel gas supplied to the internal combustion engine for rapid late-cycle injection into the cylinder of the internal combustion engine.

9 Claims, 17 Drawing Sheets

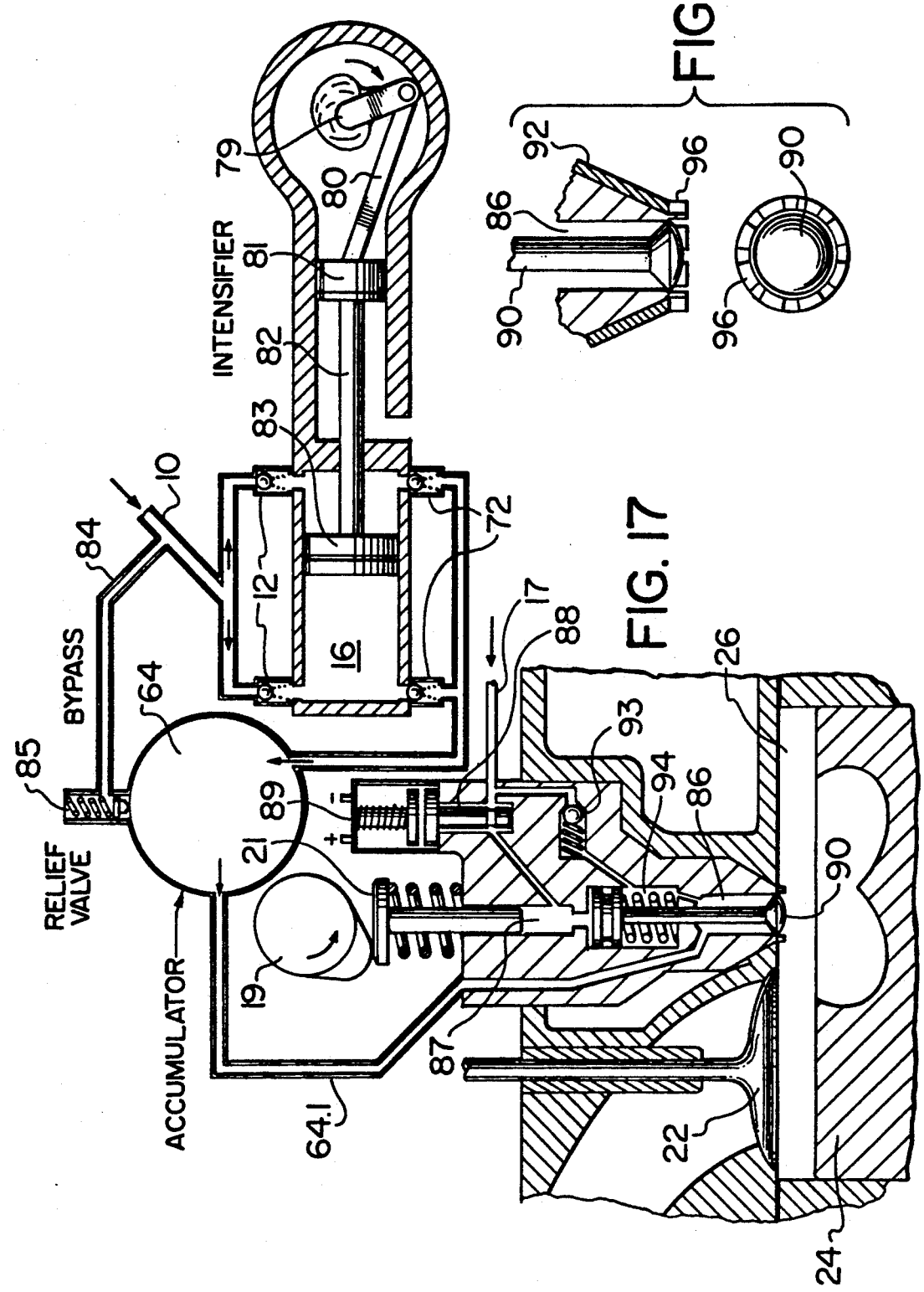

INTENSIFIER-INJECTOR FOR GASEOUS FUEL FOR POSITIVE DISPLACEMENT ENGINES

This is a continuation-in-part of application Ser. No. 07/441,104, filed Nov. 27, 1989, now U.S. Pat. No. 5,067,467.

FIELD OF THE INVENTION

This invention relates to a novel device for compressing and injecting gaseous fuel from a variable pressure gaseous fuel supply into a fuel receiving apparatus. More particularly, this invention relates to an intensifier-injector which compresses and injects gaseous fuel from a variable pressure source into the cylinder of a positive displacement engine.

BACKGROUND OF THE INVENTION

Because of its ready availability and because of its relatively low cost and potential for reducing particulate emissions, compressed natural gas is a promising candidate for fueling diesel engines. Conventional methods of fueling diesel engines by premixing air and natural gas appear to be inherently unsuitable for part load operation, at which the fuel-air mixture flammability suffers, efficiency drops substantially and emissions become excessive. In addition there is the problem of detonation under certain load conditions. These factors generally impose a limit on the feasible substitution of diesel fuel by natural gas in transport engines operating over a wide range of load and speed.

Fueling Diesel Engines with Premixed Air and Natural Gas

Much work has been done on the "natural fumigation" method of using natural gas in a diesel engine by injecting it into the inlet manifold, with injection into the cylinder of small quantities of diesel fuel for "pilot" diesel ignition. There are three major faults with this method:

1) At low load, with unthrottled diesel operation, the gas fuel and air mixture (which is essentially homogeneous) is too lean for satisfactory combustion and fuel efficiency can become unacceptable. A remedy may be to revert to mainly diesel fuel consumption at part load. However, since in many applications most of the operation may be at part load, this tends to defeat the fundamental objective of fuel substitution.

2) With low efficiency in part load operation, the emissions of unburned hydrocarbons and carbon monoxide will rise far above the acceptable limits.

3) With successful pilot diesel ignition of natural gas, engine pressure loading (both maximum pressure levels and incidence of detonation) can be harmful and there is danger of engine damage. There is typically a band of mixture strength at which the engine is prone to knock due to excessively rapid flame propagation.

The problem of the premixed gas and air forming too lean a mixture (at part load) could be alleviated by throttling the inlet air. However, this is not feasible with existing turbo-charged engines because of the danger of compressor surge. In any case throttling removes one of the inherent advantages of diesel operation.

The problem could also in principle be alleviated by preheating the air at part load; however this may adversely affect turbo-charger operation and increase the danger of detonation. A control system would be required to adjust the heating rate with load and speed and it is questionable whether at low load the exhaust heat available would be sufficient.

Control systems have been devised to vary the diesel/gas proportion as a function of load and speed. To provide acceptable operation these require detailed engine-specific performance data banks to be stored within the computers required for engine control. Development of such a system is costly and must involve compromise between the objectives of low fuel consumption, low emissions, engine durability and high fuel substitution.

Problems encountered with "natural fumigation" methods are fundamental i.e. not peculiar to one type of combustion chamber. Thus, if emissions, fuel economy during part load operation, and engine durability are each important, premixing the air and gas is not a generally suitable method for dual fueling in diesels.

An alternative method, "timed port injection", has been proposed for injection of natural gas into two-stroke diesel engines. The objective is to time the injection of natural gas into the inlet port so as to avoid wasted gas leaving with the exhaust and (ideally) at low load to have the gas stratified within the cylinder so that it can burn acceptably after compression and diesel pilot ignition. So far, this method to the applicants' knowledge has not proven capable of high efficiency, durable, clean operation over a wide range of load and speeds and with high levels of fuel substitution.

Direct Injection of Natural Gas into Diesel Engine Cylinders

The great advantage of direct injection of fuel into the engine cylinder in diesel operation is that it permits efficient and stable burning over the whole load range. This is because the burning occurs in local regions in which the fuel-air ratio is within the flammability limits. Natural gas has the advantage over diesel fuel in that it does not require atomization into (micron-size) droplets and thus does not require very high injection pressures and super fine tolerances on injector plungers. For diesel injection, pressures may need to be as high as 1000 atm for most efficient operation. It appears that for natural gas 200 atm would be satisfactory.

Successful operation of large bore diesels with diesel injection of compressed natural gas has been demonstrated in North America, see J. F. Wakenell, G. B. O'Neal, and Q. A. Baker, "High-Pressure Late Cycle Direct Injection of Natural Gas in a Rail Medium Speed Diesel Engine", SAE Technical Paper 872041, in Norway, see Einang, P. M., Korea, S., Kvamsdal, R., Hansen, T., and Sarsten, A., "High-Pressure, Digitally Controlled Injection of Gaseous Fuel in a Diesel Engine, with Special Reference to Boil-Off from LNG Tankers", Proceedings CIMAC Conf., June 1983; and Japan, see Miyake, M., Biwa, T., Endoh, Y., Shimotsu, M., Murakami, S., Komoda, T., "The Development of High Output, Highly Efficient Gas Burning Diesel Engines". The gaseous fuel for these engines was available at a constant high pressure. The work by Wakenell, et al., carried out at Southwest Research Institute, involved direct injection of natural gas into a large bore (8.5") 2-stroke, locomotive diesel engine. The natural gas was stored in liquid form (LNG), then pumped to high pressure and vaporized to give gaseous injection pressures of 5000 psi (340 atm.). The gas injector valve replaced the diesel injector and a small diesel injector was installed in the "test-cock" hole in the cylinder head. Full rated power was achieved with less than 2% pilot diesel fuel (98% natural gas) and thermal efficiency was slightly lower than 100% diesel operation. The Norwegian work, carried out under the direction of Professor Arthur Saarsten at Trondheim, involved the direct injection of methane gas into a large bore (300 mm) two-stroke single-cylinder engine. The injection pressure was in the range 150–160 atm. The diesel injector was left unmodified and a hole was bored in the cylinder head for a gas injection valve. With 73% (energy proportion) natural gas fueling, thermal efficiencies were slightly better than when running with 100% diesel oil. In preliminary tests gas injection gave only slightly higher smoke reading than with 100% diesel and NOx emissions were reduced about 24%.

The Japanese work, carried out at the Mitsui Engineering and Ship Building Company, included study of the gas jet velocity field in the cylinder and tests on a large bore (420 mm) single cylinder four-stroke engine. The gas was injected at about 250 atm. In one test series, the pilot diesel fuel was injected through a separate diesel injection system. With as low as 5% diesel pilot fuel energy input, the overall efficiency at 85% of engine load was the same as with full diesel fueling. An improved fuel injection nozzle with integral injection of the diesel pilot fuel also provided satisfactory performance. The overall result was that "almost equal" performance was obtained with natural gas fueling as with 100% diesel operation.

With the natural gas stored on the vehicle in liquid form (LNG), i.e. at very low temperatures in a well insulated tank, the liquid can be readily compressed (and probably vaporized) before injection into the engine cylinder. However, wide spread availability of LNG for vehicles is not now foreseeable, whereas compressed natural gas (CNG) is quite widely available. Experience on large bore diesel engines, while not directly applicable to medium bore engines used for bus and truck applications, is indicative that natural gas could be burned satisfactorily in these engines with direct injection.

A problem for transport engines is that the gas will not be available at a constant supply pressure.

An Integrated Intensifier-Injector for Compressed Natural Gas used in Transport Diesel Engines For CNG it appears that the safe upper limit for gas storage will be about 200 atm, which is near the required injection pressure. However, to obtain 93% of the energy stored in the tank, the pressure will have to be allowed to drop to about 20 atm before refueling. The energy required to recompress from 20 atm to 200 would be a small part of what is required for the compression from 1 atm to 200.

It would be desirable for direct injection of CNG into diesel engines to have a system which will:
(i) replace the conventional injector with no modification of other engine parts;
(ii) compress the natural gas as needed, as well as inject it into the cylinder, as the gas supply pressure varies from 200 to 20 atm;
(iii) permit simultaneous injection of diesel pilot fuel (or other additives) for ignition;
(iv) be capable of precise control of injection quantity, timing, and duration;
(v) be adaptable in design to commercial unit injector systems; and
(vi) be adaptable to any composition of natural gas.

The CNG must be compressed to operating levels, particularly when the pressure of the CNG drops to relatively low levels. This CNG pressure intensification must be adjustable and controlled to provide the required amount of pressurized CNG to the engine, which varies with engine speed and load, regardless of CNG storage pressure. It is essential that this process be efficient to minimize engine power and efficiency losses. A further restriction to the intensifier system is physical size and orientation which is limited on many applications such as urban buses.

Two U.S. patents disclose fuel injection systems:

U.S. Pat. No. 4,406,404, "Diesel Fuel Injection Nozzle", Horino et al., Sep. 27, 1983, discloses a method of injecting fuel into the combustion chamber of a diesel engine cylinder. Included is a plunger mounted in a nozzle body to define an air chamber for receiving compressed air from the combustion chamber during the compression stroke of the piston in the engine cylinder. Formed integral with the plunger, a needle valve defines within the nozzle body a fuel chamber for receiving fuel to be injected. A nozzle tip secured to the nozzle body forms a premixing chamber open directly to the combustion chamber and communicates with both air chamber and fuel chamber. Thus, upon descent of the plunger at the end of the compression stroke, the fuel from the fuel chamber is intimately premixed in the premixing chamber with the compressed air from the air chamber, prior to introduction into the combustion chamber.

Horino et al. specify that "the fuel from the fuel chamber is intimately premixed within the premixing chamber with the compressed air from the air chamber prior to introduction into the combustion chamber". Thus premixing, and a premixing chamber are required, the fuel and air are not mixed in the engine chamber.

The Horino et al. device relates to "diesel fuel" only. There is no mention of natural gas or of dealing with the essential problem of how to compress and inject a gaseous fuel into a compression-ignition engine.

Horino et al. do not mention a pilot injection of liquid diesel fuel (or other means) which is required to assist in compression ignition of the natural gas. They also do not mention an intensifier mechanism.

U.S. Pat. No. 4,201,160, "Fuel Injection Systems", Fenne and Greenford, May 6, 1980, discloses a fuel injection system for supplying fuel to a combustion space of an internal combustion engine. This includes a fuel injection nozzle having a fuel inlet and outlets which direct fuel into the combustion space. A piston is provided with a cylinder, one end of which is subjected to the pressure within the combustion space. The other end of the cylinder communicates with the inlet of the nozzle and a valve is provided whereby a fuel injection pump is held out of communication with the inlet of the nozzle until the piston has moved inwardly under the action of rising pressure within the combustion chamber. During the inward movement fuel is displaced by the piston to the nozzle and this is supplied as a pilot quantity of fuel to the combustion space.

Fenne et al. disclose that the fuel injector is a supplementary injector to provide early injection of a small portion of the fuel requirement, see "the main quantity of fuel being supplied by the main pump to the nozzle". All of the fuel is not delivered by a single unit.

Fenne et al. do not mention gaseous fuel nor do they include provision for intensifying the fuel pressure (i.e.

increasing the fuel pressure to at least twice the pressure of the compressed air which actuates the intensifier).

SUMMARY OF THE INVENTION

The invention is a new device for compression and injection of gaseous fuel from a variable pressure supply (along with possible use of an entrained liquid fuel which could serve as an ignition source) into the cylinder of an internal combustion engine. If entrained liquid fuel is desired for ignition, the gas injection at high velocity could atomize the liquid fuel. The primary application of the invention is to compression ignition (diesel) engines but secondary fields of application are spark, catalytic surface, and hot surface ignition engines.

The invention involves a method and an intensifier-injector for gaseous fuels in internal combustion engines comprising means which utilizes a compressed gas or fluid or mechanical means to drive an intensifier means which raises the pressure of fuel gas supplied to the internal combustion engine for rapid injection into the cylinder of the internal combustion engine. Sources of the intensifier drive gas or fluid include, but are not limited to: compressed air from the cylinder of the turbocharged or supercharged internal combustion engine; compressed air from an external compressor, e.g. air-brake compressor; high pressure hydraulic fluid; or lube oil; or air compressed by a turbocharger or supercharger.

The invention pertains to an apparatus as defined, wherein the internal combustion engine is a positive displacement engine.

An apparatus as defined, wherein the gaseous fuel is drawn from a variable pressure gaseous fuel supply.

In the preferred embodiment, the intensifier-injector for fuel gas used in combination with an internal combustion engine having a cylinder chamber which intensifier-injector comprises: (a) a hollow chamber means; (b) a reciprocating intensifier means having a large area end and a small area end mounted within the interior of the hollow chamber means; (c) a means for introducing pressurized gas or fluid from the intensifier drive source into the hollow chamber means on the small area end of the intensifier means; (d) one-way means for enabling fuel gas to be supplied into the hollow chamber means at the large area end of the intensifier means; (e) nozzle means for enabling the fuel gas at the small area end of the intensifier means to be injected into the cylinder chamber; and (f) timing means synchronized with the internal combustion engine for opening and closing the nozzle means (e).

The invention is directed to a method of supplying gaseous fuel to the compression cylinder of an internal combustion engine.

DRAWINGS

In the drawings which depict specific embodiments of the invention but which should not be construed as restricting or confining the spirit of scope of the invention in any way:

FIGS. 17 and 17a illustrates an alternative apparatus for transporting, conditioning, mixing and introducing two fuels into the combustion chamber of an internal combustion engine.

DETAILED DESCRIPTION OF SPECIFIC EMBODIMENTS OF THE INVENTION

Figure 1:
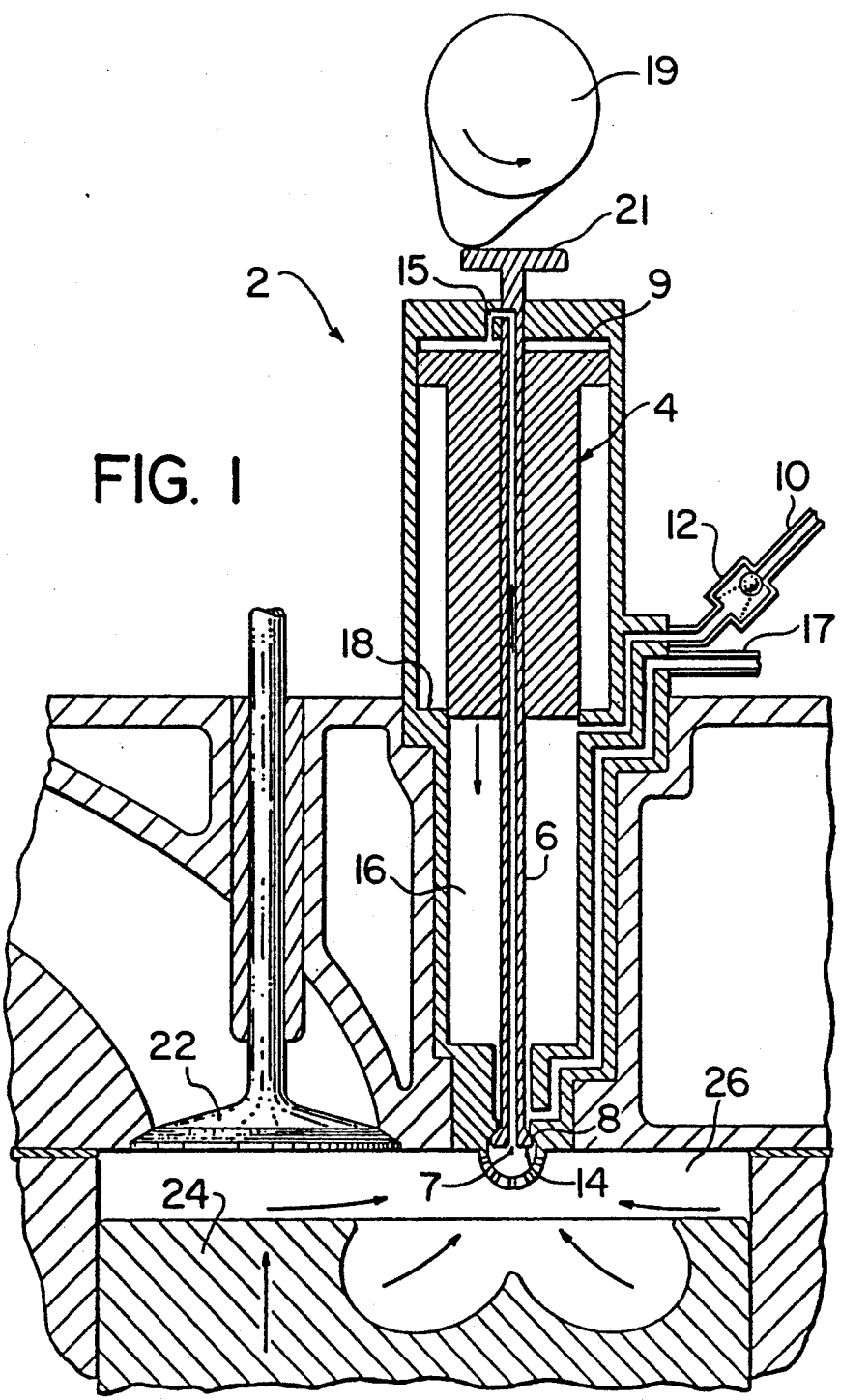
FIG. 1 illustrates a schematic diagram of the intensifier-injector for gaseous fuels.

To enable direct injection of gaseous fuel into diesel systems, a unit is desired which will:

(i) replace the conventional injector with no modification of engine cylinder, head or piston;

(ii) compress the natural gas or other gaseous fuel, as needed, as well as inject it into the cylinder. The gas supply will typically vary in pressure from 200 to 20 atm;

(iii) permit simultaneous injection of diesel pilot fuel or other additives for ignition, or be adaptable to use of an alternative ignition method e.g. spark plug catalytic surface, or hot surface ignition;

(iv) enable precise control of injection quantity, timing and duration;

(v) adapt readily in design to current engines having unit injector systems; and (vi) accommodate any composition of gaseous fuel.

The subject invention represents a novel advance over present technology in that it enables on board compression to high pressure of a gaseous fuel from a variable pressure source. One method of fuel gas pressure intensification uses a portion of compressed air, obtained during the compression stroke, or possibly combustion gas, to drive an intensifier which singly or in association with supplemental compression raises the pressure of the fuel gas sufficiently for rapid gas injection into the engine cylinder. The intensifier can also be driven by an available low pressure compressed air supply such as is commonly used for vehicle air brakes. High pressure gaseous fuel injection can be used to "gas blast" atomize the pilot liquid fuel injection. The invention is not limited to pilot liquid fuel ignition, but can coexist with glow plug or spark-assisted ignition.

One purpose of the invention is to permit high-efficiency low-pollution use of gaseous fuels in diesel engines, while preserving the advantages of high compression ratio non-throttling operation.

The invention can be used for direct replacement of liquid injectors in road and rail diesels as well as off-highway truck and marine diesels with gaseous fuel injectors from on-board compressed gas storage tanks, or for stationary applications where the gas supply pressure is less than, say, 200 atm. Several versions of the invention are feasible for simple replacement of injectors without the need for engine modifications other than control system adaptation. Other versions are suitable for new designs of diesel engine heads.

Discussion Of The Physical Principles Applying To The Integrated Intensifier-Injector For Natural Gas For illustration of the basic principle of the invention, assume that compressed gas (or high pressure combustion gas) from the engine cylinder or another source of high pressure fluid is used in an intensifier to compress the natural gas fuel to a pressure sufficiently high for injection into the cylinder.

The following calculations confirm the viability of the invention. For purposes of illustration, an injection pressure of 200 atm of compressed natural gas fuel is assumed. It is also assumed that the minimum supply pressure from the tank is 20 atm. This 10:1 pressure ratio for natural gas is equivalent to a volume ratio of about $10^{1/1.3} = 6$. A single stage of compression is feasible.

The volume of the intensifier is dependent on the volume of CNG entering the intensifier. At 20 atm and 300 K the CNG will have a density of $$\rho_1 = \frac{P}{RT} = \frac{20\,(101)}{0.518\,(300)} = 13 \text{ kg/m}^3$$

For a typical diesel engine of 1 liter displacement per cylinder, 17:1 compression ratio, 90% volumetric efficiency and a turbocharger pressure ratio of 1.3:1, the mass of air ingested per cycle is:

$$M_a = \mu_a \eta_v V_d = 1.2 * 1.3 * 0.9 * 1 \times 10^{-3} = 0.0014 \text{ kg}$$

The stoichiometric fuel-air mass ratio for methane is 1:17.2 kg/kg so a maximum mass of natural gas injected per stroke is:

$$M_g = M_a/20 = 0.00007 \text{ kg}$$

Assuming injection pressure of the natural gas is 200 bar ($\rho_a = 130$ kg/m$^3$, the maximum volume injected per stroke is:

$$V_{inj} = M_g \rho_g = 560 \text{ mm}^3$$

Assuming polytropic compression of the natural gas from the minimum supply pressure of 20 bar, the total volume of the fuel-gas side of the intensifier, $V_1$, is calculated as:

$$V_1 = V_2 * (P_{inj}/P_{min})^{1/n} \text{ where } V_2 = V_{inj} + V_{clear}$$

$V_2$ is the volume on the fuel gas side of the intensifier after compression of the gaseous fuel to injection pressure ($P_{inj}$) but before injection of the gas into the engine cylinder. Practical designs include passages for delivering the fuel to the engine combustion chamber which result in a small clearance volume, $F_{clear}$, that will contain high pressure gaseous fuel after completion of the injection event. Assuming a passage of 2 mm diameter and 100 mm in length, the clearance volume would be approximately 300 mm$^3$. Using a polytropic coefficient of $n_{CNG} = 1.25$ for the compression of the gas ($k_{CH4} = 1.3$):

$$V_1 = 5820 \text{ mm}^3$$

$$V_2 = 850 \text{ mm}^3$$

Since the injection of the gaseous fuel may be desired at as much as 40° before top dead center (BTDC), the air pressure in the engine cylinder at this crank angle must be sufficient to pressurize the gaseous fuel to injection pressure. In a typical diesel engine, the piston has moved approximately 85% of the full stroke when the crank angle is 40° BTDC. As the intensifier piston moves to compress the gaseous fuel, the effective volume of the combustion chamber necessarily increases by the amount $V_{air}$:

$$V_{air} = (A_{air}/A_g) * (V_1 - V_2)$$

Increasing the turbocharger pressure ratio (within achievable limits) increases cylinder pressure which reduces intensifier area ratio, thus reducing the volume of air consumed by the intensifier ($V_{air}$), thus reducing the additional air required to maintain the original compression ratio of the engine. An iterative procedure for the typical diesel engine used above results in a turbocharger pressure ratio of 3.1 (versus the original 1.3) to maintain the same volumetric compression ratio (17:1 * $1.3^{1/n} = 21:1$) and the resulting intensifier area ratio would be 11.1:1. For a single cylinder, an intensifier with 50 mm stroke would require a 41 mm bore on the air side, 12.2 mm bore on the gaseous fuel side.

Modification to the engine turbocharger/supercharger pressure ratio is essential to provide additional air for the intensifier while maintaining the equivalent engine compression ratio. An intake bypass control system would be necessary to adjust turbo boost depending on engine load (demand for fuel) and fuel supply pressure. The above example is for the worst case of maximum fuel demand and minimum supply pressure (specified as 20 bar). All other cases, i.e., for reduced engine load or higher fuel supply pressure, would require a lower turbo pressure ratio to maintain the original engine compression ratio.

This example pertains to an intensifier for a single engine cylinder but is easily adaptable to multi-cylinder engines with either single or multiple intensifiers. Note that for a six cylinder version of the example engine, a single intensifier with 100 mm stroke would require 70 mm bore on the air side, 21 mm bore on the gaseous fuel side.

This example pertains only to the use of compressed air taken from the engine cylinder prior to combustion. Alternatively, high-pressure combination product gas may be used to pressurize a common accumulator.

Other drive sources for the intensifier include high pressure hydraulic fluid from an external pump. In the case where the hydraulic fluid is at pressures higher than the desired gaseous fuel injection pressure, the intensifier would be driven by the small-area piston and the gaseous fuel would be compressed by the large-area piston. Note that the volume of the gaseous fuel compression side would remain the same while the drive side would be greatly reduced. For the above six-cylinder example with 5000 psi hydraulic drive, the drive side bore could be reduced to about 16 mm (from 70 mm). Since no air is used by the intensifier when driven by hydraulics, the turbocharger/supercharger need no modification. The hydraulic driven intensifier could be controlled by varying the volume flow and/or pressure of hydraulic fluid by means of a variable displacement pump.

The displacement on the air side of the intensifier is about 11000 $mm^3$ which is about 1.1% of the engine piston displacement, or about 20% of the clearance volume.

Figure 2:
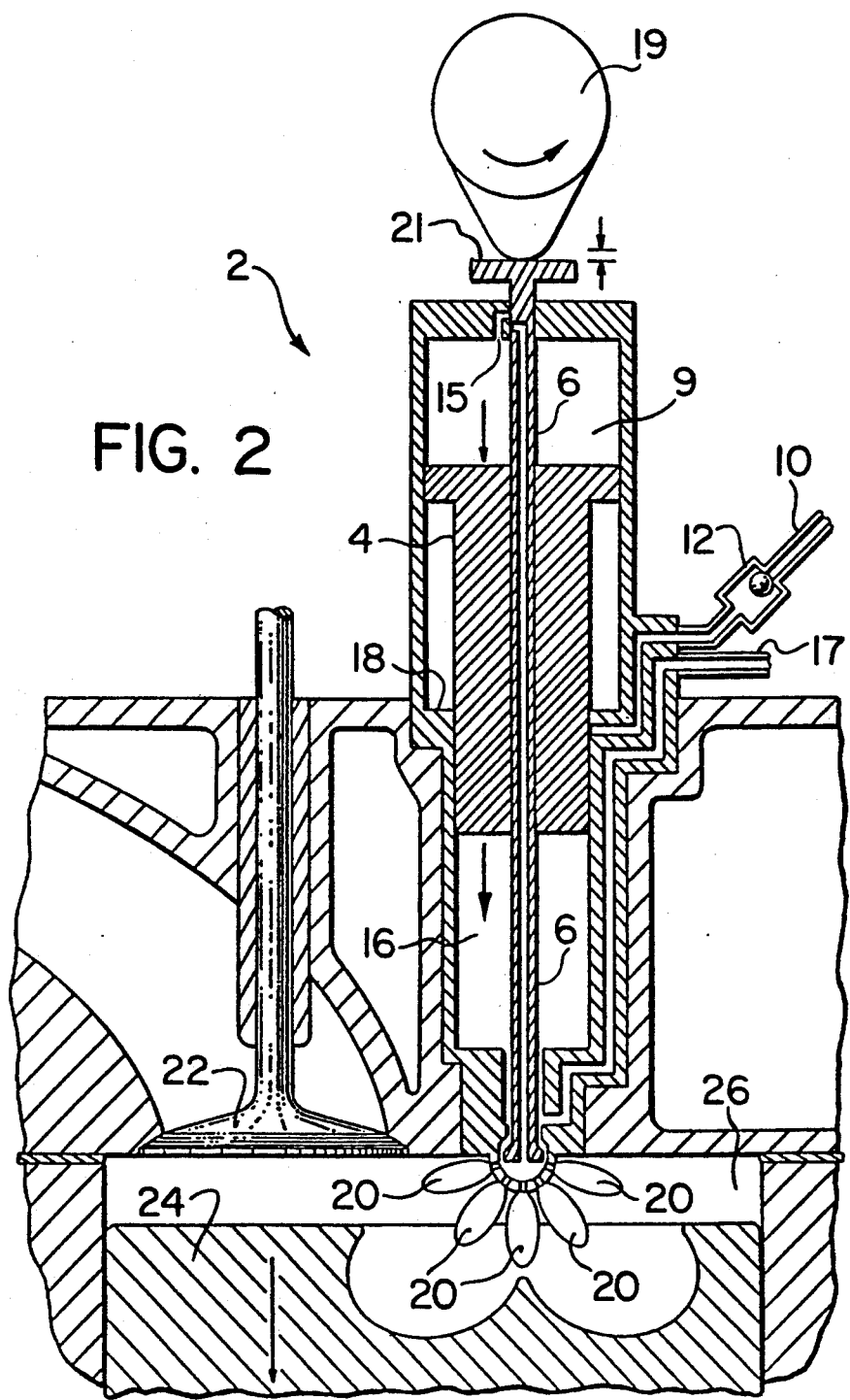
FIGS. 2 and 3 illustrate respective sequential operational views of the intensifier illustrated in FIG. 1.
Figure 3:
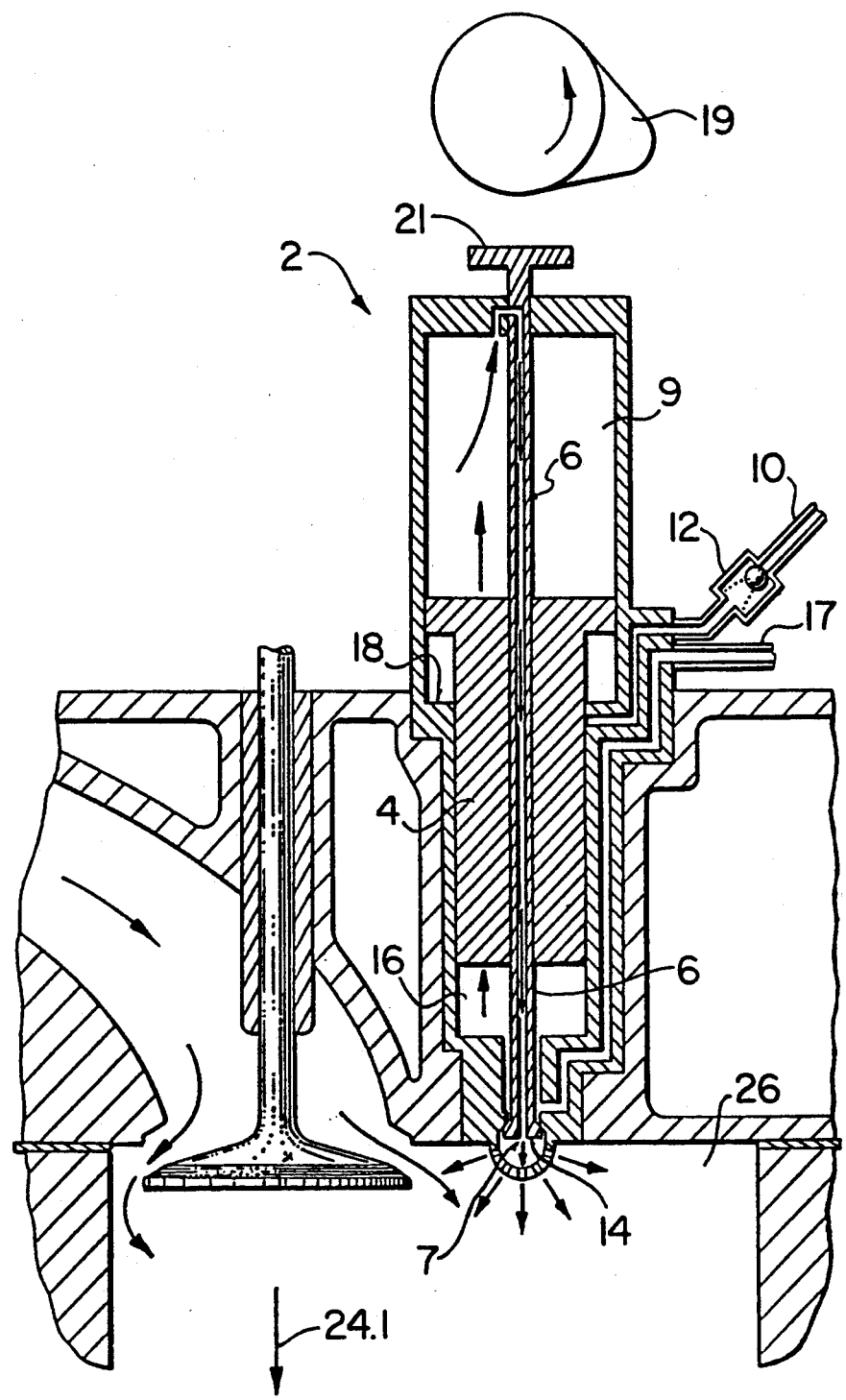

The discussion will now focus on specific embodiments of the invention. FIGS. 1, 2 and 3 show in schematic form, roughly to scale, one mechanical embodiment of the intensifier 2 and its operational sequence. The intensifier illustrated in FIG. 1 (adapted for use with a diesel engine) has two moving parts, namely an intensifier piston 4 and a hollow gas injector valve stem 6 which supplies compressed air through compressed air inlet 7 to the top surface of the intensifier piston 4 (as shown by directional arrows). Prior to gas injection, a nozzle 8 at the bottom of the intensifier 2 is closed and compressed gas from the engine chamber 26, caused by rising piston 24, is admitted to the chamber 9 above the intensifier piston 4 via hollow stem 6 and inlet 15. FIG. 1 shows the compressed gas from the engine chamber 26 entering the intensifier through inlet 7 and to the top of the piston 4 by inlet 15 and pushing piston 4 down. When the pressure exceeds about one tenth that of the pressure in the gas supply 10, the intensifier piston 4 moves downwards in the interior cylinder 16 of the intensifier 2 thereby compressing the gas in cylinder 16, which is trapped by the check valve 12, thereby building the gas pressure in the chamber 16 to as high as 200 atm. Diesel fuel is supplied to the chamber 26 through an inlet 17.

As shown by FIG. 2, at fuel injection time, the gas injection valve 14 is opened by downward mechanical, hydraulic, pneumatic or electromagnetic actuation of its stem 6. A cam 19 is shown in FIGS. 1, 2 and 3, and pushes stem 6 downwardly a distance indicated at the top of FIG. 2 by hitting plate 21. This suddenly releases the gas pressure in chamber 16 through the nozzle opening 8 while simultaneously closing off the compressed gas from the engine chamber 26 through channel 16 via inlet 15 to the top of the intensifier piston 4. Fuel injection into chamber 26 is illustrated by plumes of droplets 20.

As shown by FIG. 3, when the downward valve stem 6 actuation by cam 19 terminates, the stem 6 rises and the valve 14 reseats. The chamber 9 at the top of the intensifier piston 4 is again in communication with the engine cylinder 26 and remains depressed in the downward position until the cylinder pressure in chamber 26 and 9 falls (during exhaust and intake strokes) below the pressure of the gas trapped in chamber 16 at the point of valve closure 14. The pressure of this trapped gas in chamber 16 returns the intensifier piston 4 to the top position (as seen in FIG. 1), thereby allowing a recharging of the supply gas through supply line 10 into chamber 16. The ultimate downward movement of piston 4 is limited by shoulder 18. Valve 22 in FIG. 3 is shown open to permit inlet air to enter the engine chamber 26. FIGS. 1, 2 and 3 illustrate a perforated hemispherical bulb 28 which is located below valve 14 and assists in dispersing the injected fuel into chamber 26.

When the supply pressure is high, or engine demand is low (low load), the piston movement or speed will be low and the consumption of air from the engine cylinder will be small. The addition of, or modifications to, existing turbocharger or supercharger is necessary to maintain adequate cylinder pressure for combustion if cylinder gas is used to drive the intensifier.

Variations and Adaptations of the Intensifier-Injector

Not shown in FIG. 1 but part of the overall concept are:

(i) the means of metering the fuel supply according to engine load;

(ii) the possibility of provision of liquid diesel fuel to the gaseous fuel valve port other than by "gas blast" injection of quantities large enough to supply an adequate ignition source;

(iii) the adaptations of the concept to form a replacement for specific diesel fuel injectors for existing diesel engines e.g. DDC, Caterpillar, Cummins, International Harvestor engines used in transportation. Such replacement could use existing engine injection timing methods and require no engine modifications other than injector replacement and control system modification;

(iv) the adaptations of the concept for fuels other than natural gas;

(v) the mechanical arrangements for mechanical, hydraulic, pneumatic or electromagnetic valve stem actuation.

(vi) the placement of an intensifier between cylinders to use combustion pressure from one cylinder to intensify the gas supply to a second cylinder.

Figure 4:
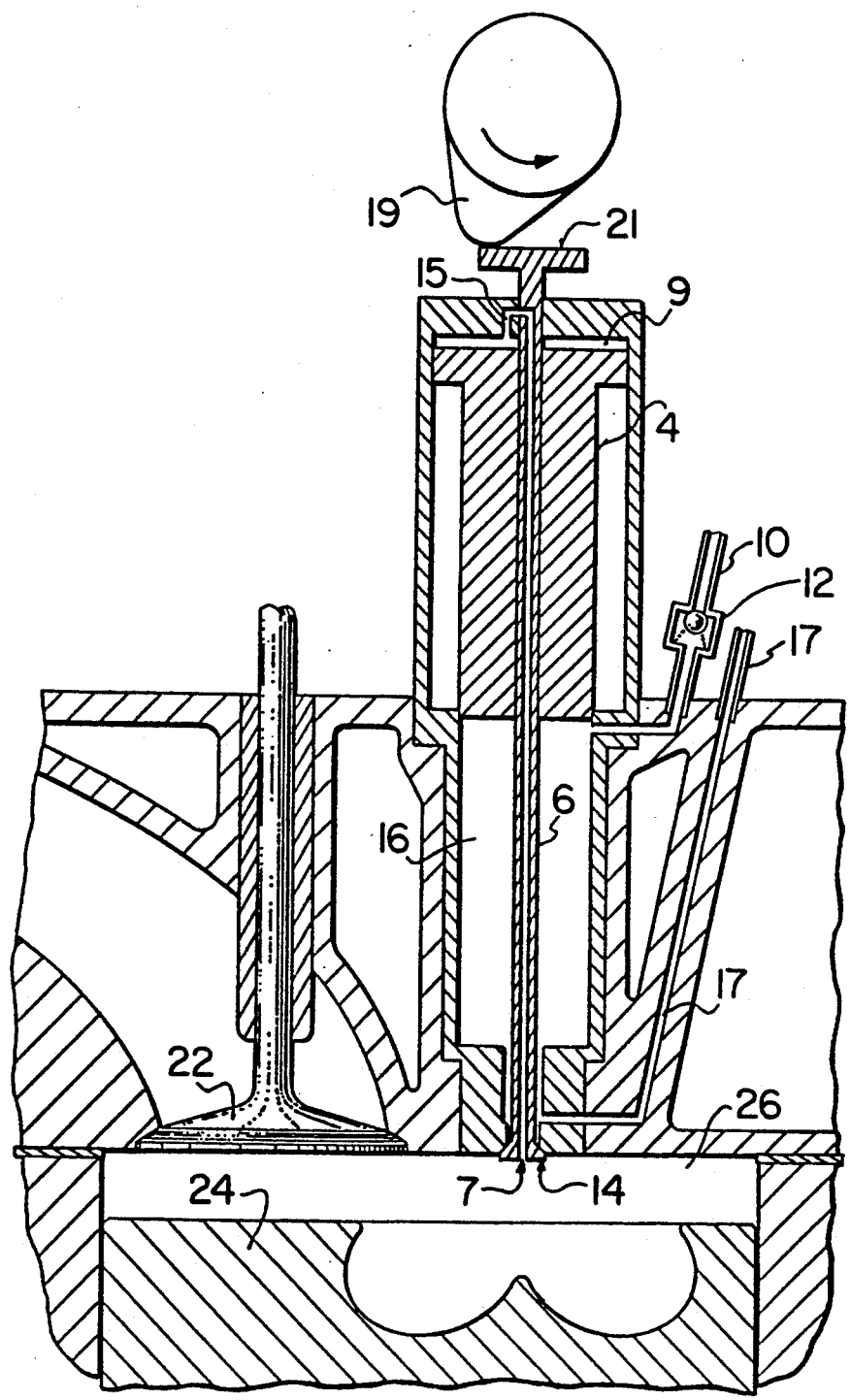
FIG. 4 illustrates a schematic view of the intensifier with a bare nozzle.
Figure 5:
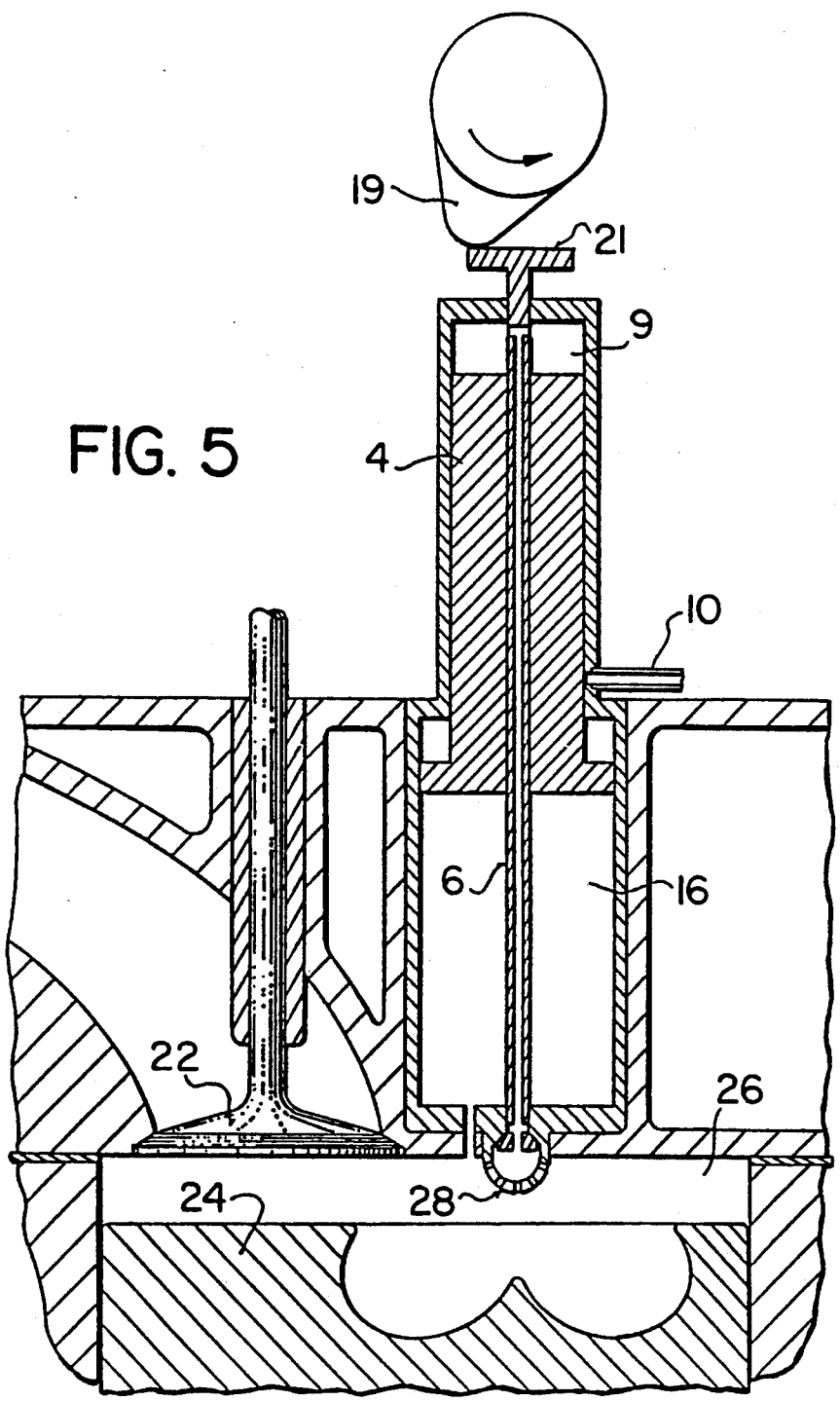
FIG. 5 illustrates a schematic view of the intensifier with an inverted piston.
Figure 6:
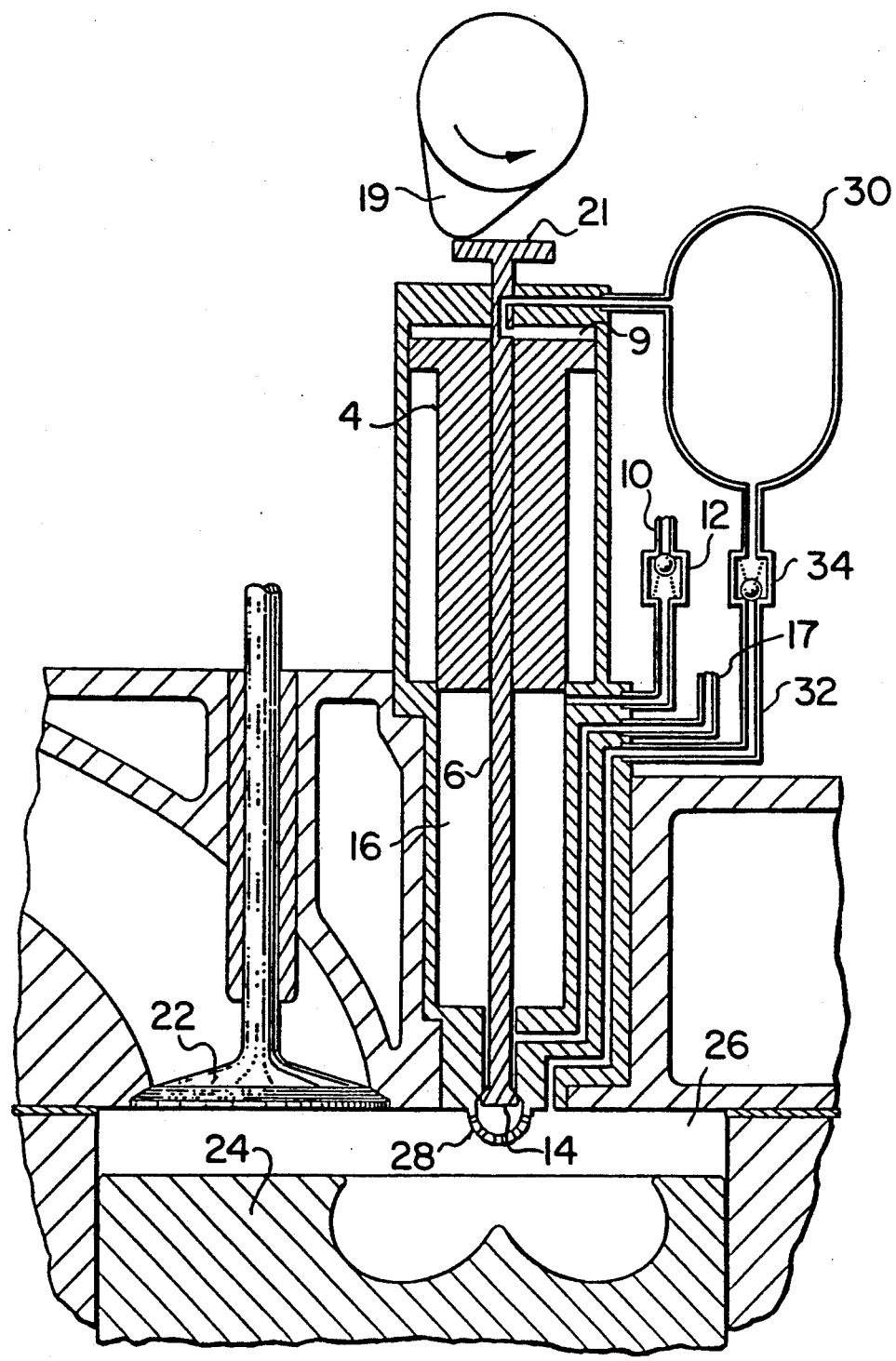
FIG. 6 illustrates a schematic view of the intensifier with an auxiliary compressed gas storage tank.

FIGS. 4, 5 and 6 show three other embodiments of the intensifier-injector invention. FIG. 4 displays a variation of the injection nozzle arrangement, with no perforated hemispherical bulb 28 below the valve 14. A bulb 28 may not be necessary in certain situations. FIG. 5 shows an alternative intensifier piston 4 arrangement. The piston 4 as seen in FIG. 5 is inverted, which in certain instances may be attractive for performance purposes. The gas supply inlet 10 is located at a higher elevation in this embodiment.

FIG. 6 illustrates an external accumulator 30 in conjunction with the intensifier-injector 2. The accumulator 30 may be advisable in certain situations to provide a larger compressed gas capacity. FIG. 6 also illustrates a line 32 which has a check valve 34 and enables the pressure in chamber 26 to communicate with chamber 9. This is used instead of hollow stem 6 and inlet 15.

Figure 7:
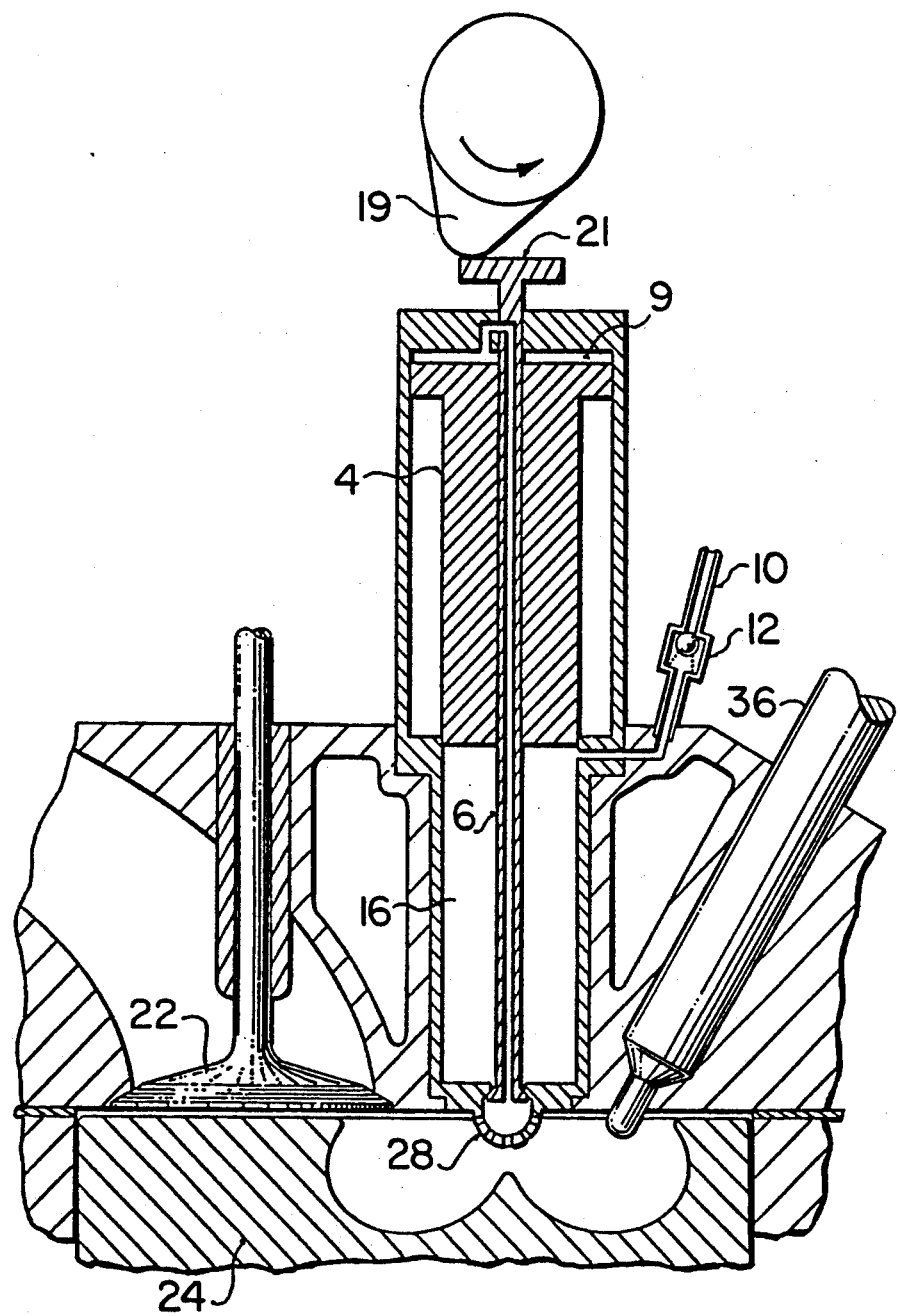
FIG. 7 illustrates a schematic view of the intensifier in combination with a diesel fuel injector.

FIG. 7 shows a separate diesel injector 36 coupled with an intensifier-injector 2.

Figure 8:
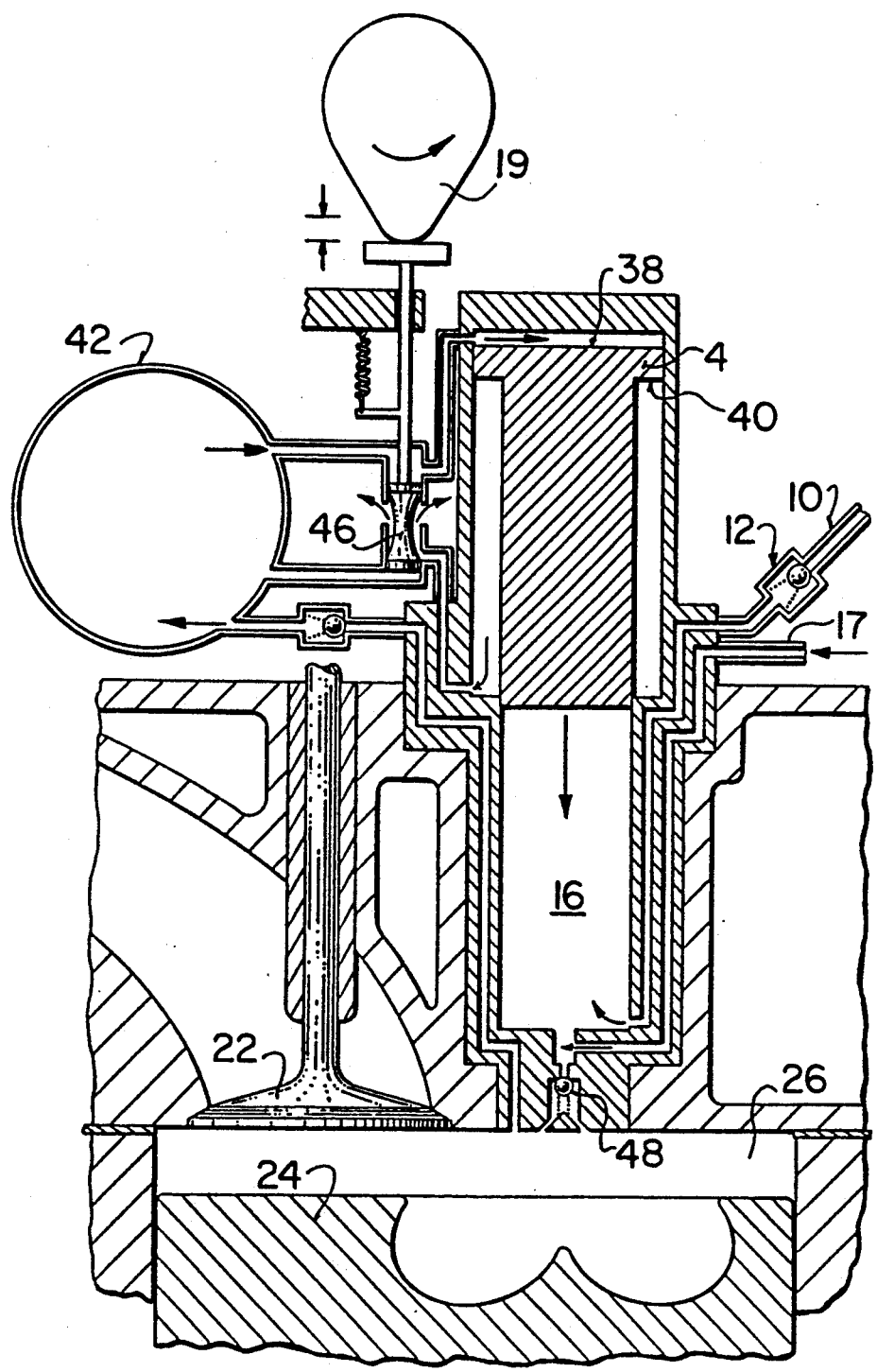
FIG. 8 illustrates a schematic view of the intensifier with connections adapted to drive the piston by differential pressures controlled by an external valve.

FIG. 8 shows an embodiment of the invention wherein the intensifier piston 4 is driven by differential pressures on its two unequal-area piston faces 38 and 40. The pressures are derived from an accumulator/high-pressure storage tank 42 which in turn receives post-ignition high-pressure gas from the engine combustion chamber 26 through a one-way check valve 44. These high-pressure stored gases are directed by a sliding spool valve 46 which is actuated by cam 19. This cam 19 is synchronized with the engine crank (not shown) and cam duration may be adjusted during engine operation to account for various required load levels. The fuel gas trapped under the small-area side 40 of the intensifier piston is compressed before being released into the combustion chamber 26 through a pressure relief valve 48 set at about 200 atmospheres. This system, though more complex than that shown in the previously discussed embodiments, should offer quicker intensifier piston response and movement due to the higher pressures available from the gas storage tank 42 and the quick acting sliding spool valve 46.

Figure 9:
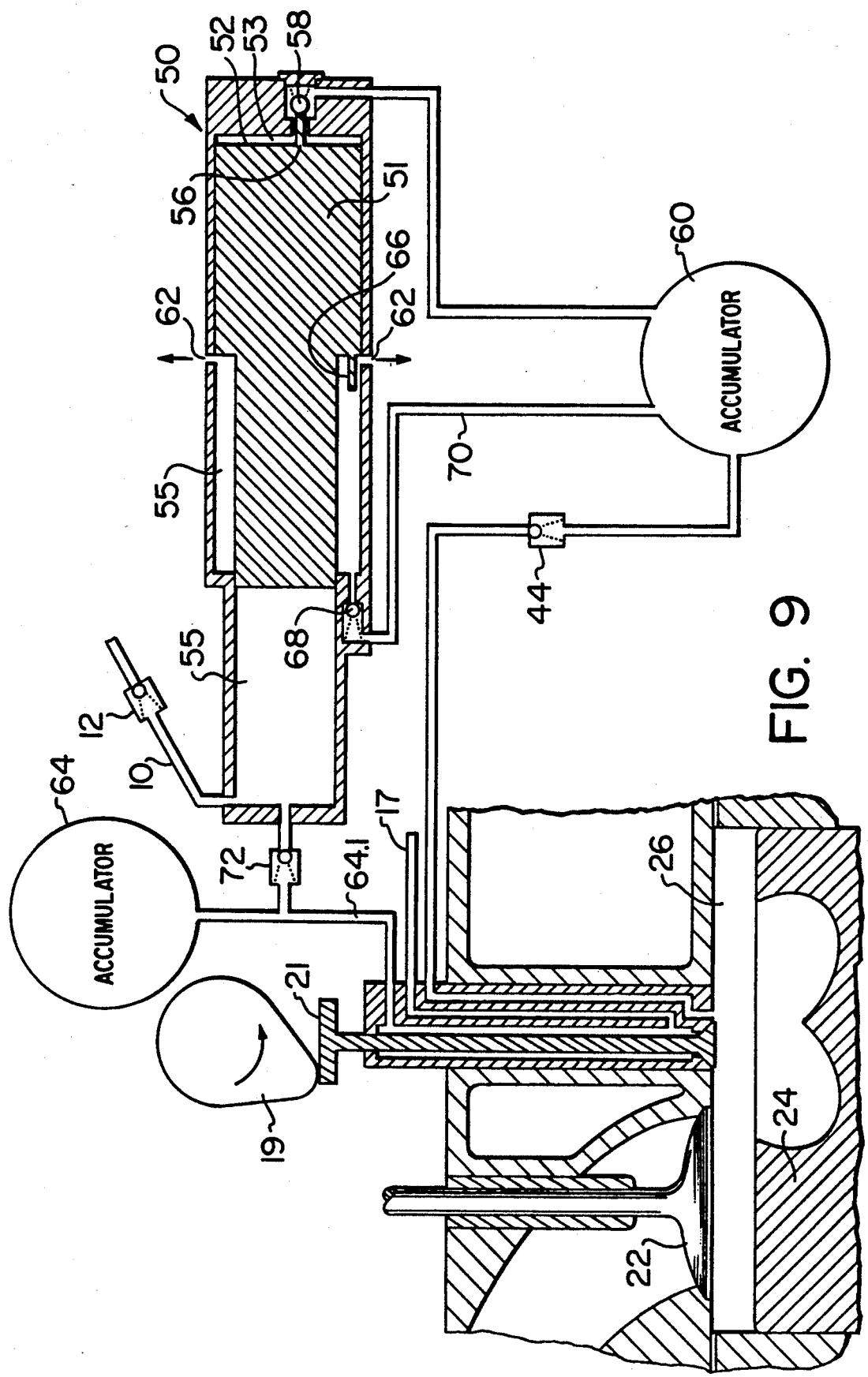
FIG. 9 illustrates a schematic view of an intensifier adapted for single-or multiple-cylinder engines.
Figure 10:
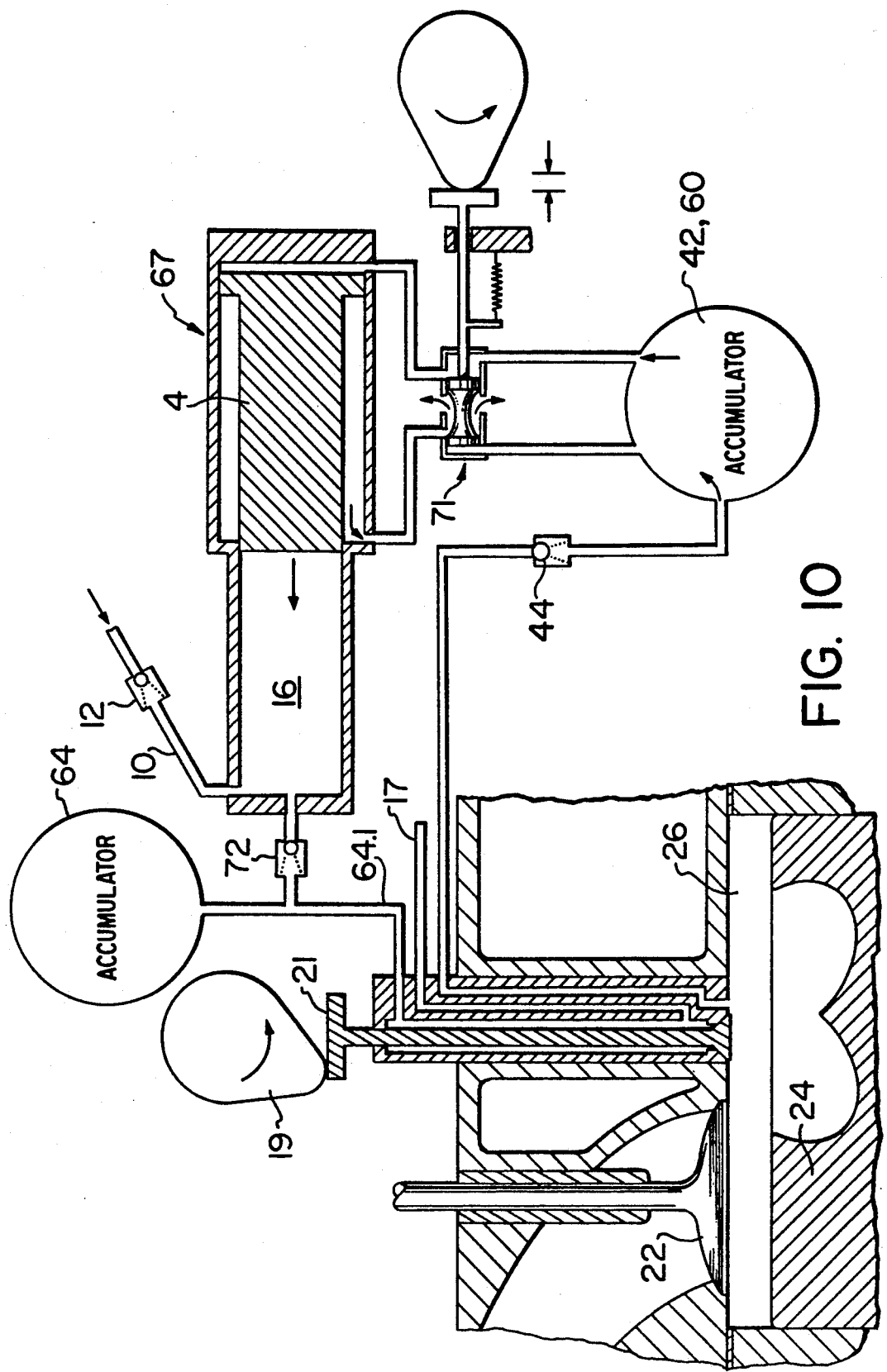
FIG. 10 illustrates a schematic view of the intensifier controlled by a cam actuated sliding spool valve.

FIGS. 9 and 10 disclose alternative embodiments incorporating the same theme. FIG. 9 illustrates a single intensifier unit 50 for single- or multiple-cylinder engines (though it is not limited by this application) which receives differential pressures on its two piston faces 52 and 54. The narrow protrusion 56 from the face 52 of the piston 51 pushes the sealing ball valve 58 off its seat thus allowing high-pressure gas from the compressed gas storage tank 60 to enter into the chamber 53 when the piston 51 is near top dead center (as seen in FIG. 9). Meantime, the expanded gases in the other chamber 55 are allowed to exit the chamber through a port 62 cut into the side of the cylinder 50. This same port 62 serves both chambers.

FIG. 9 also shows a check valve 68 and return line 70 which permit gas in chamber 55 to pass to tank 60 when activated by protrusion 66. The larger area piston 51 acts directly towards compressing the fuel gas at the far end of the chamber 55. This compressed fuel gas passes through one-way check valve 72 and is stored in an accumulator/high-pressure storage tank 64 where individual fuel supply lines (only one supply line 64.1 is shown) provide high-pressure fuel gas to individual engine chambers (not shown). Each engine chamber has a dual-fuel injector which is operated by a cam 19 or other means. The intensifier piston 51 oscillates at a speed independent of engine speed, though it may slow down when the engine slows down due to less availability of high-pressure gas from the engine cylinders. While this embodiment is relatively simple, an auxiliary mechanism may be required to start the piston oscillations when the engine is started. This "embodiment" should offer easy adaptation to existing hardware since the intensifier and tanks may be located away from the limited-space engine chamber area.

The embodiment illustrated in FIG. 10 is similar to that shown in FIG. 9, but the intensifier 67 is controlled by a cam 69 actuated sliding spool valve 71. This mechanism is very similar to that shown in FIG. 8 and the same description applies and should be readily understandable to a person skilled in the art. As in FIG. 9, the high-pressure fuel gas is stored and distributed from a tank 64. Also, each chamber has its own dual-fuel injector.

Figure 11:
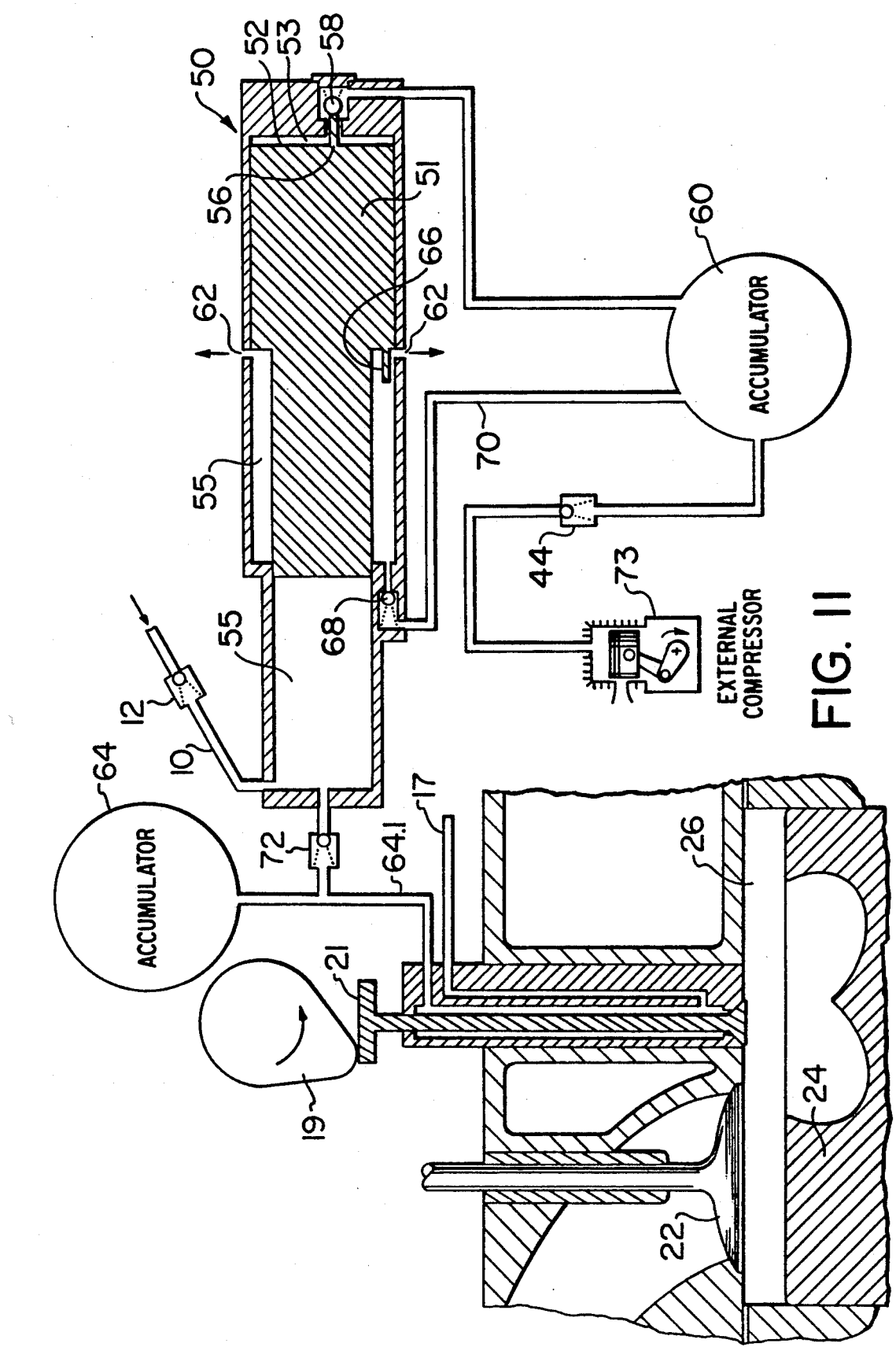
FIG. 11 illustrates a schematic view of an intensifier driven by compressed gas from an external compressor.

The embodiment illustrated in FIG. 11 is similar to that shown in FIG. 9, but the intensifier is driven by compressed air from an external compressor 73 (e.g. an air-brake or air-starter compressor).

Figure 12:
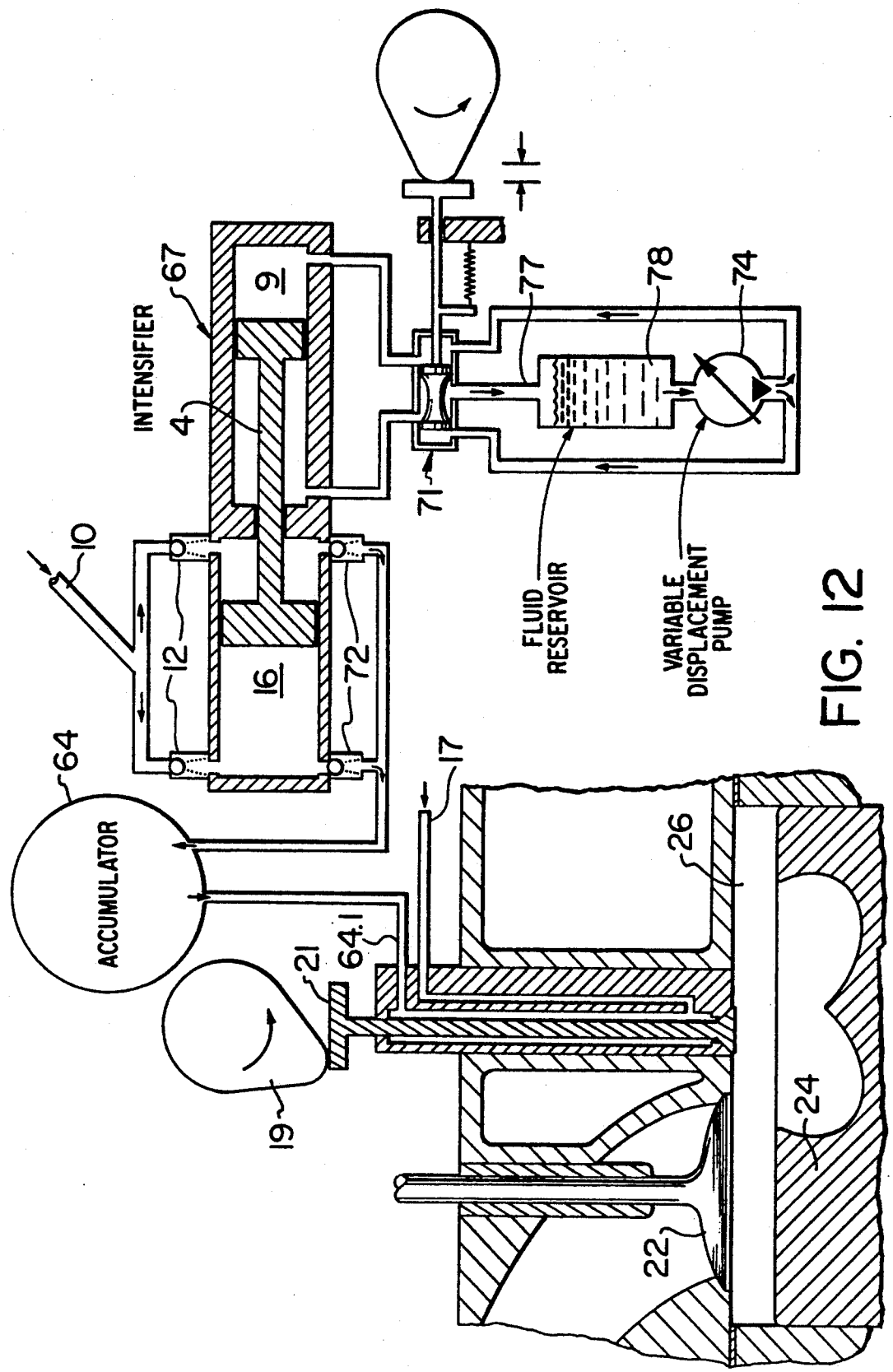
FIG. 12 illustrates a schematic view of an intensifier driven by pressurized fluid from an external pump.

The embodiment illustrated in FIG. 12 is similar to that shown in FIG. 11, but the intensifier is driven by pressurized fluid (e.g. hydraulic diesel or lube oil) from an external pump 74.

High pressure fluid is directed to the appropriate end of the double-acting hydraulic cylinder 9 by a directional control spool valve 71. The directional control valve 71 simultaneously opens the opposite side of the hydraulic cylinder to the low pressure reservoir 78 via the return line 77. Hydraulic flow rate and/or pressure can be controlled to regulate reciprocation speed of intensifier and hence maintain the desired flow rate of gaseous fuel to the engine. Gaseous fuel flow to and from the double-acting intensifier can be controlled solely by check valves (12 and 72). High pressure gaseous fuel is stored in the gaseous fuel accumulator 64 for injection into the engine controlled by the poppet valve 21. A small quantity of diesel fuel is admitted through the diesel line 17 into the engine combustion chamber 26 with the gaseous fuel to provide an ignition source (pilot ignition case).

FIG. 12 illustrates the case where the hydraulic fluid is delivered to the intensifier at a higher pressure than that required for fuel gas injection and hence the piston area of the hydraulic cylinder is smaller than that of the fuel gas cylinder. FIG. 12 shows a double-acting configuration in which fuel is compressed by piston 4 movement in both directions.

Figure 13:
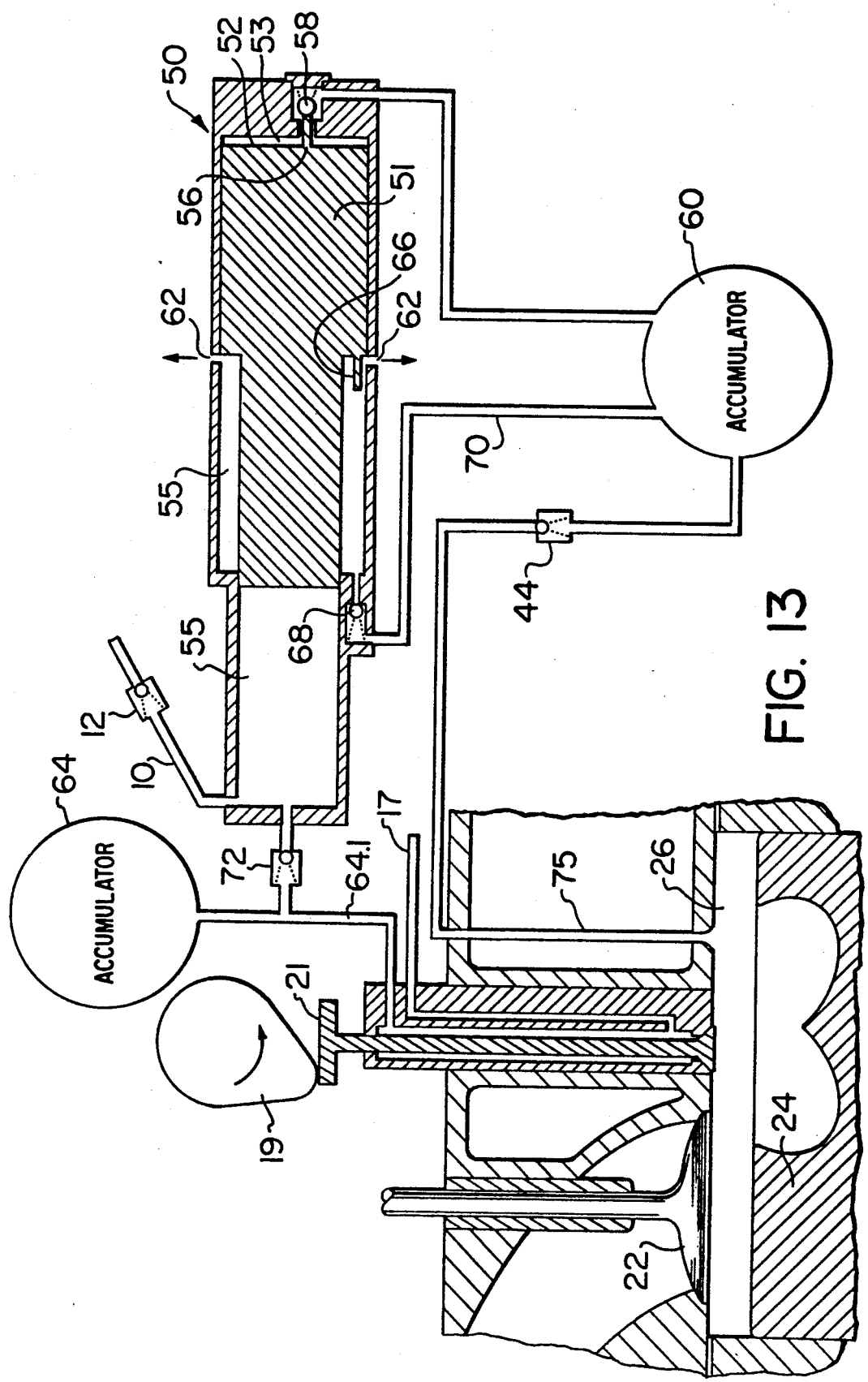
FIG. 13 illustrates a schematic view of an intensifier driven by compressed gas from the engine cylinder chamber by means of a port in the engine cylinder head.

The embodiment illustrated in FIG. 13 is similar to that shown in FIG. 9, but the compressed gas from the engine cylinder chamber for driving the intensifier is provided by way of a port 75 in the engine cylinder head external to the injector.

Figure 14:
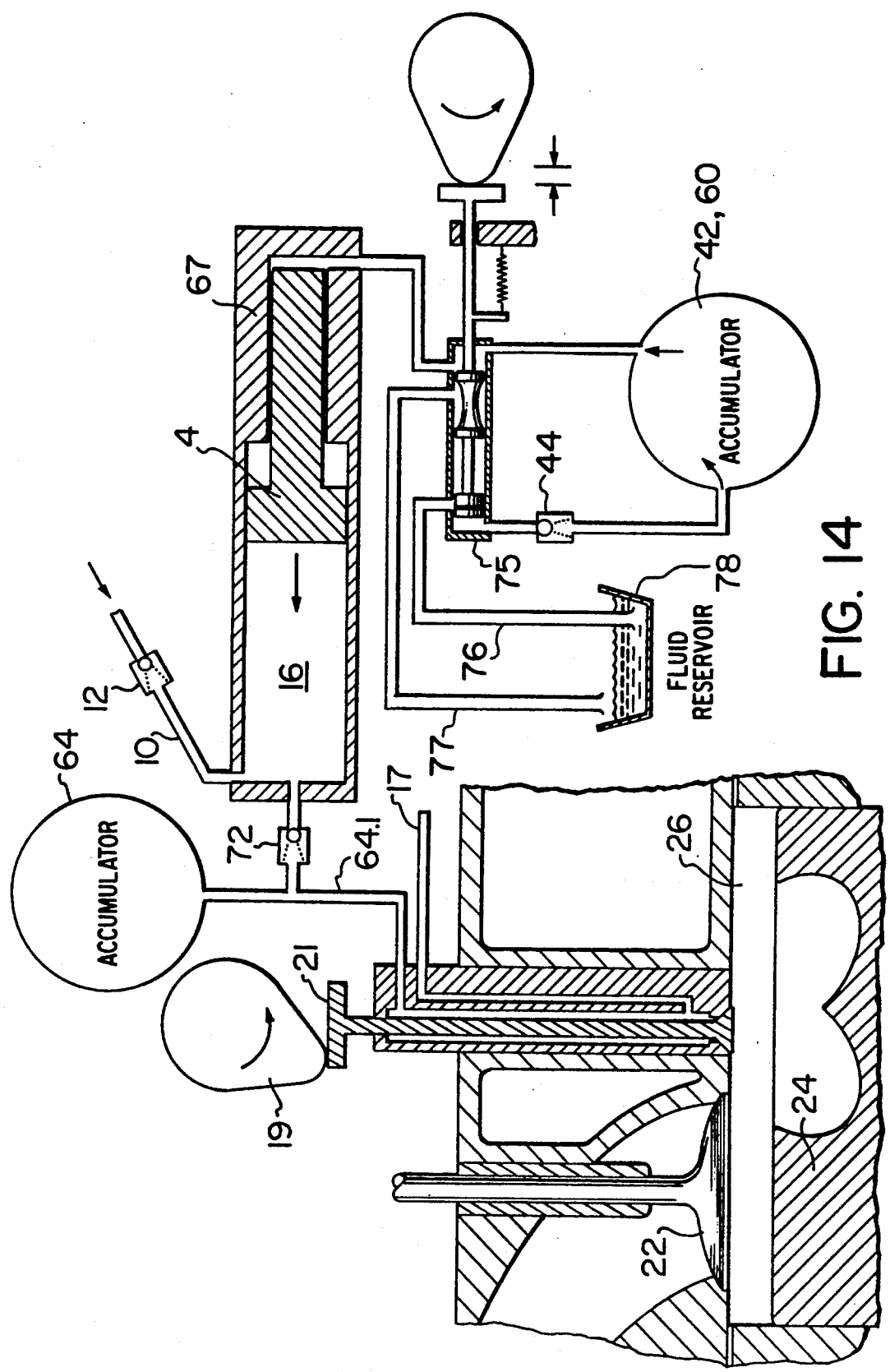
FIG. 14 illustrates a schematic view of an intensifier driven by high pressure fluid from a cam driven plunger. In this case, since the desired fuel-gas pressure is less than the intensifier driver fluid, the high pressure fluid acts on the small area end of the intensifier piston and the fuel gas is compressed by the large area end of the intensifier piston.

The embodiment illustrated in FIG. 14 is similar to that shown in FIG. 12, but the intensifier is driven by high pressure fluid (e.g. diesel or lube oil) from an cam driven plunger 75. The high pressure fluid acts on the small area end of the intensifier piston to compress the fuel gas existing in the follow chamber of the large area end of the intensifier piston. Exhausted fluid is returned to the reservoir 78 by the spool valve 71 through the return line 77.

Figure 15:
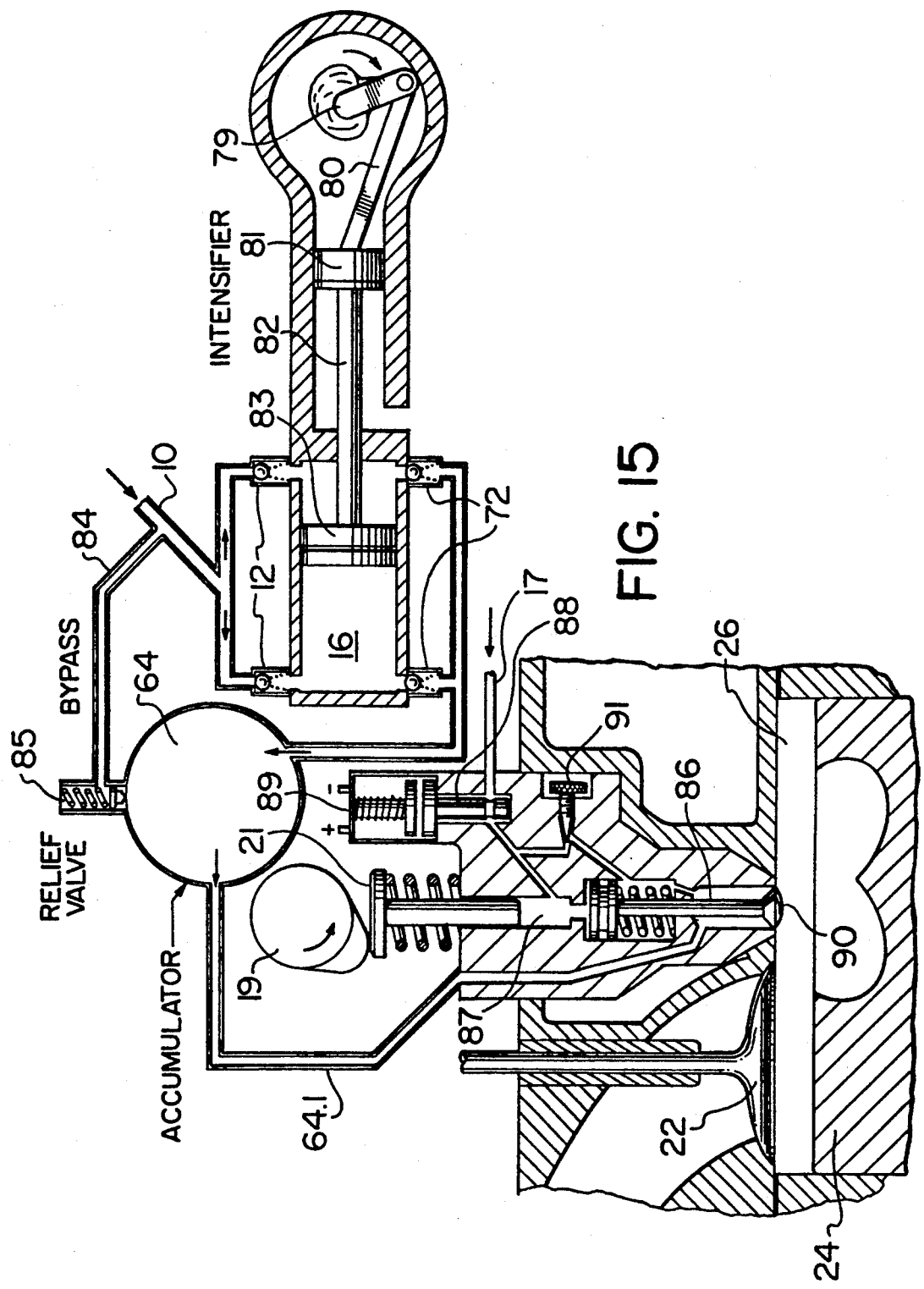
FIG. 15 illustrates a schematic view of an intensifier driven by an engine-driven crankshaft, connecting rod, piston combination which provides reciprocating motion to the intensifier.

FIG. 15 illustrates a schematic view of an engine-driven crankshaft, connecting rod, piston combination which provides reciprocating motion to the intensifier piston means. The electrohydraulic timing means of the engine is used as a source of pressurization of the liquid pilot fuel. In this case, the intensifier consists of a guide piston 81 which is driven by a crankshaft 79 and connecting rod 80 combination. The guide piston 81 is connected by a connecting rod 82 to the piston 83 which reciprocates in cylinder 16. The piston 83 is double-acting as shown in FIG. 12. A pair of check valves 12 which are connected to gas supply 10 are located at each end on one side of the cylinder 16. This provides intensifying action in both stroke directions. A pair of check valves 72 with lines connecting to the accumulator 64 are located at each end of the opposite side of cylinder 16. A bypass line 84, in combination with relief valve 85, connects gas supply line 10 and accumulator 64, providing a means for regulating gaseous fuel pressure and thus controlling the quantity of high-pressure fuel. Fuel collected in accumulator 64 is dispensed through fuel line 64.1 to cavity 86. The injection of fuel into combustion chamber 26 can be electro-hydraulically controlled with the following operation sequence: As engine piston 24 approaches top-dead-centre (TDC) cam 19 contacts plunger 21 imparting a downward motion which displaces liquid fuel from plunger cavity 87 past spool valve 88 while it is in the open position. At the desired timing for beginning injection, spool valve 88 is moved to the closed position by electronic actuation of solenoid 89 thereby confining the remaining liquid fuel in plunger cavity 87. Subsequent downward motion of the plunger 21 generates high pressure in the liquid fuel which forces open nozzle 90 allowing gaseous fuel and any entrained pilot fuel to enter the engine combustion chamber 26. High pressure liquid fuel may also be directed to cavity 86 where it can be gas-blast atomized by the high-pressure gaseous fuel. The ratio of liquid pilot fuel to principle gaseous fuel can be controlled by metering device 91. After the desired injection duration, the electronic signal to solenoid 89 is removed, allowing spool valve 88 to return to the open position, relieving liquid fuel pressure thereby causing nozzle 90 to return to the closed position by means of a return spring.

Figure 16:
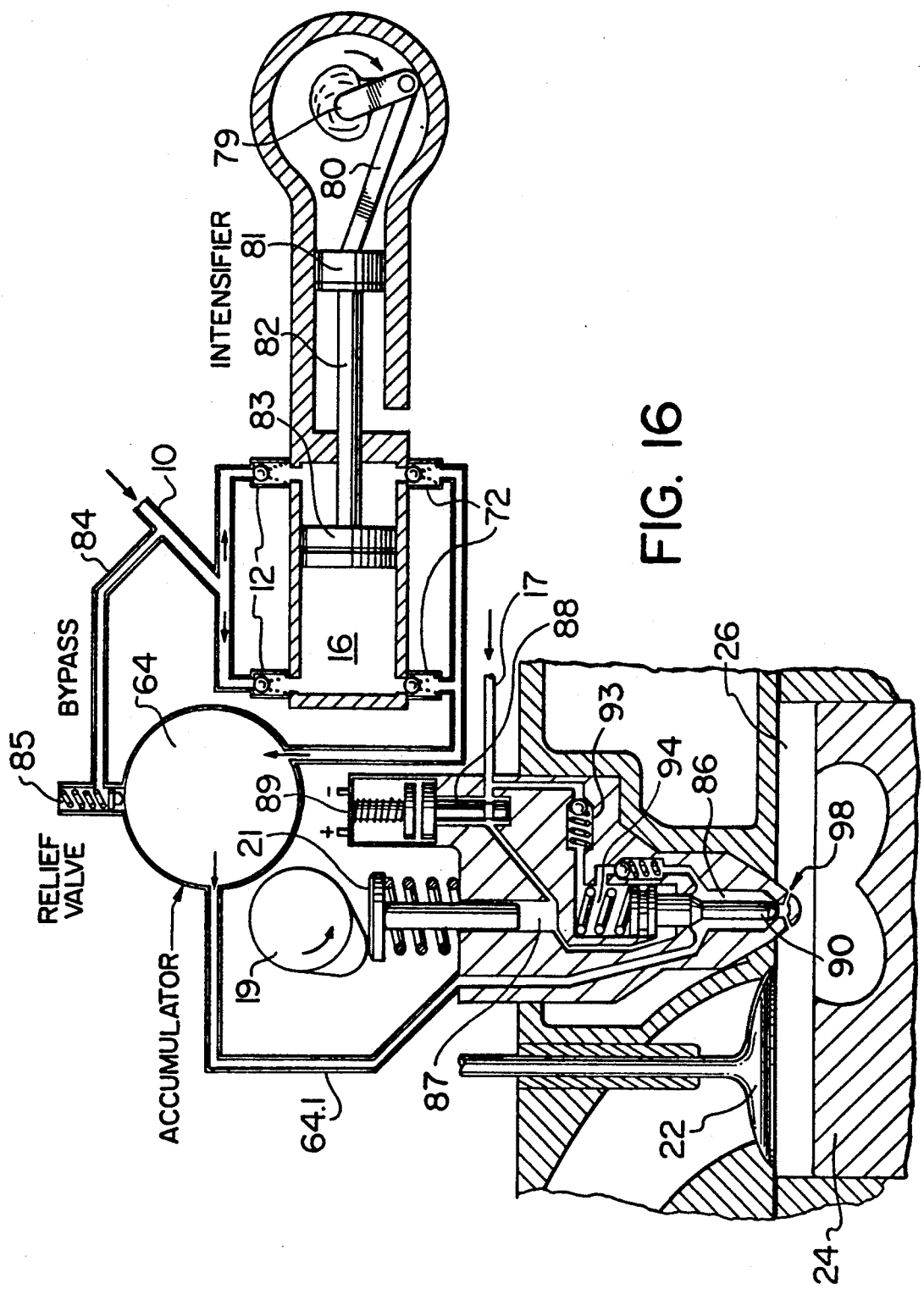
FIG. 16 illustrates a schematic view of an apparatus for atomizing liquid fuel by gaseous fuel and injecting the two fuels into the combustion chamber of an internal combustion engine.

FIG. 16 illustrates a schematic view of an apparatus for atomizing liquid fuel by gaseous fuel and injecting the two fuels into the combustion chamber of an internal combustion engine. FIG. 17 illustrates an alternative apparatus for transporting, conditioning, mixing and introducing two fuels into the combustion chamber of an internal combustion engine.

Specifically, FIGS. 16 and 17 illustrate alternative embodiments of apparatus for transporting, conditioning, mixing and introducing two fuels into the combustion chamber of an internal combustion engine. As seen in FIG. 16, a liquid pilot fuel is atomized by means of gas-blast atomization in chamber 86 by the gaseous principal combustion fuel, which can be natural gas, methane, propane, hydrogen or some other suitable gaseous combustion fuel. The ratio of liquid pilot fuel to gaseous principal combustion fuel is controlled by the metering combination 93,94. Check valve 93 allows filling of chamber 94 with liquid pilot fuel which dispenses approximately constant quantity of pilot fuel when nozzle 90 moves upward while opening. The approximately constant quantity of liquid pilot fuel is atomized by, and mixed with, varying amounts of gaseous principal fuel. The apparatus includes a means of creating swirling flow in area 86 of the gaseous principal fuel to enhance atomization and mixing of the liquid pilot fuel within the injector. Mixing of the fuel-air mixture is also enhanced within the combustion chamber of the internal combustion engine. As seen in FIG. 16, a multi-hole nozzle 98 can be used to provide discrete plumes of fuel to penetrate into the combustion chamber. This controls the fuel jet plume configuration. The timing and duration of the injection of the mixture of gaseous principal fuel and liquid pilot fuel can be controlled electro-hydraulically as described for FIG. 15.

As seen in FIG. 17, a castellated projection 96 is used to control the fuel jet sheet configuration by providing for pressure equalization across the jet sheet into the gas jet. FIG. 17(a) illustrates a bottom detailed view of the castellated projection 96 illustrated in FIG. 17. A controlled quantity of liquid pilot fuel is dispensed into cavity 86 from chamber 94 as nozzle 90 moves downward while opening.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

We claim:

1. A method of supply gaseous fuel directly into a combustion chamber of an internal combustion engine which comprises utilizing mechanical means to drive a pressure intensifier means which compresses the gaseous fuel to an injection pressure which is sufficient to exceed a pressure in the combustion chamber, thereby enabling the gaseous fuel to be rapidly injected into the combustion chamber, wherein a single injector is used for injecting fuel gas and liquid pilot fuel into the combustion chamber and wherein the injection of the fuel gas is conducted at a sufficiently high velocity to atomize the liquid pilot fuel injected with the fuel gas.

2. An intensifier-injector for fuel gas and entrained liquid pilot fuel used in combination with an internal combustion engine having a cylinder chamber, which intensifier-injector comprises:
    (a) a hollow cylinder;
    (b) a reciprocating intensifier means mounted within the interior of the hollow cylinder;
    (c) one-way means for enabling fuel gas to be supplied into the hollow cylinder at the opposite end of the intensifier means;
    (d) injector nozzle means for enabling the fuel gas and entrained liquid pilot fuel to be injected into the combustion chamber;
    (e) electrohydraulic or mechanical timing means synchronized with the internal combustion engine for opening and closing the compressed gas injector nozzle means (d); and
    (f) crankshaft, connecting rod and piston means mechanicaly driven by the internal combustion engine for providing reciprocating motion to the reciprocating intensifier means (b).

3. An apparatus as claimed in claim 2 wherein the reciprocating intensifier means (b) is double-acting to provide pressurizing action on the fuel gas when the reciprocating intensifier means moves in either direction.

4. An apparatus for transporting, controlling, mixing and introducing a liquid pilot fuel and a gaseous principal fuel into a combustion chamber of an internal combustion engine comprising means for atomizing the liquid pilot fuel by gas-blast atomization thereof by the gaseous principal fuel.

5. An apparatus as claimed in claim 4 which includes a metering means which dispenses a controlled quantity of liquid pilot fuel to be atomized by, and mixed with, varying amounts of gaseous principal fuel.

6. An apparatus as claimed in claim 4 which includes a means which creates swirling flow of the gaseous principal fuel to enhance atomization and mixing of the liquid pilot fuel within an injector means which injects the mixture of gaseous principal fuel and liquid pilot fuel into the combustion chamber of the internal combustion engine.

7. An apparatus as claimed in claim 4 which includes a castellated projection which controls gaseous fuel jet sheet configuration by providing pressure equalization across the jet sheet.

8. An apparatus as claimed in claim 4 which includes a multi-hole nozzle which controls gaseous fuel jet plume configuration to provide discrete plumes of fuel to penetrate into the combustion chamber.

9. An apparatus as claimed in claim 4 which includes a means for controlling the timing and duration of injection of the mixture of gaseous principal fuel and liquid pilot fuel.

* * * * *

UNITED STATES PATENT AND TRADEMARK OFFICE
CERTIFICATE OF CORRECTION

PATENT NO. : 5,315,973
DATED : May 31, 1994
INVENTOR(S) : Philip G. Hill and K. Bruce Hodgins It is certified that error appears in the above-indentified patent and that said Letters Patent is hereby corrected as shown below:

In column 14, claim 2, lines 26 and 27, please delete "mechanicaly" and substitute therefor --mechanically--.

Signed and Sealed this

Thirteenth Day of September, 1994

*Attest:*

BRUCE LEHMAN

*Attesting Officer*    *Commissioner of Patents and Trademarks*